US011166192B2

(12) United States Patent
Park et al.

(10) Patent No.: US 11,166,192 B2
(45) Date of Patent: Nov. 2, 2021

(54) SIGNALING STRATEGY FOR ADVANCED RECEIVER WITH INTERFERENCE CANCELLATION AND SUPPRESSION

(71) Applicant: QUALCOMM Incorporated, San Diego, CA (US)

(72) Inventors: Seyong Park, San Diego, CA (US); Wanshi Chen, San Diego, CA (US); Hao Xu, Beijing (CN); Wei Zeng, Saratoga, CA (US); Renqiu Wang, San Diego, CA (US); Peter Gaal, San Diego, CA (US); Tingfang Ji, San Diego, CA (US); John Edward Smee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/538,672

(22) Filed: Aug. 12, 2019

(65) Prior Publication Data
US 2019/0364454 A1 Nov. 28, 2019

Related U.S. Application Data

(62) Division of application No. 15/707,607, filed on Sep. 18, 2017, now Pat. No. 10,412,627.
(Continued)

(51) Int. Cl.
*H04W 72/08* (2009.01)
*H04W 28/04* (2009.01)
(Continued)

(52) U.S. Cl.
CPC .......... *H04W 28/04* (2013.01); *H04B 7/0848* (2013.01); *H04J 11/0023* (2013.01);
(Continued)

(58) Field of Classification Search
CPC . H04W 28/04; H04W 72/082; H04J 11/0023; H04L 5/0092; H04L 1/0038;
(Continued)

(56) References Cited

U.S. PATENT DOCUMENTS

| 2010/0238888 A1* | 9/2010 | Sampath | ............... H04W 24/02 370/329 |
| 2012/0275402 A1* | 11/2012 | Prasad | .................. H04L 5/0073 370/329 |

(Continued)

OTHER PUBLICATIONS

3GPP-1, R4-131319—NAICS—Reference receivers Apr. 2013 (Year: 2013).*

(Continued)

*Primary Examiner* — Dong-Chang Shiue
(74) *Attorney, Agent, or Firm* — Norton Rose Fulbright LLP

(57) ABSTRACT

Signaling strategies for an advanced receiver with interference cancellation (IC) and suppression is discussed. Upon enablement of an advanced interference cancellation procedure according to the disclosure, transmitters within the enabled area transmit according to transmission restriction configurations that provide transmission limits based on either frequency, time, or scheduling. The restrictions on the transmitters reduces the complexity of processing by neighboring advanced receivers for cancellation of interference from the restricted transmitters. At the advanced receiver, transmission information, such as scheduling, reference signal (RS), resource block (RB) allocation, and the like, may either be determined through blind detection or received directly through signaling. The advanced receiver may use this transmission information associated with each interfering signal to detect, decode, and subtract the interfering signals from the received transmissions.

20 Claims, 11 Drawing Sheets

Related U.S. Application Data

(60) Provisional application No. 62/421,142, filed on Nov. 11, 2016.

(51) Int. Cl.
*H04B 7/08* (2006.01)
*H04J 11/00* (2006.01)
*H04L 5/00* (2006.01)
*H04L 25/02* (2006.01)
*H04L 1/00* (2006.01)
*H04B 7/0452* (2017.01)

(52) U.S. Cl.
CPC .......... *H04L 1/0038* (2013.01); *H04L 5/0092* (2013.01); *H04L 25/0204* (2013.01); *H04L 25/0224* (2013.01); *H04W 72/082* (2013.01); *H04B 7/0452* (2013.01); *H04J 2011/0096* (2013.01); *H04L 1/0045* (2013.01); *H04L 5/0007* (2013.01); *H04L 5/0035* (2013.01); *H04L 5/0044* (2013.01); *H04L 25/0202* (2013.01)

(58) Field of Classification Search
CPC . H04L 5/0035; H04L 5/0044; H04L 25/0202; H04L 5/0007; H04B 7/0452
See application file for complete search history.

(56) References Cited

U.S. PATENT DOCUMENTS

| | | | |
|---|---|---|---|
| 2013/0058294 A1 | 3/2013 | Miki et al. | |
| 2013/0107836 A1 | 5/2013 | Miki et al. | |
| 2014/0133411 A1 | 5/2014 | Park et al. | |
| 2015/0201421 A1* | 7/2015 | Park | H04L 1/00 455/452.1 |
| 2015/0222304 A1* | 8/2015 | Xu | H04L 5/0053 370/329 |
| 2015/0245366 A1* | 8/2015 | Davydov | H04J 11/0056 370/329 |
| 2015/0288505 A1* | 10/2015 | Park | H04L 5/0091 370/336 |
| 2015/0372778 A1 | 12/2015 | Xu et al. | |
| 2015/0372779 A1* | 12/2015 | Lim | H04W 56/003 370/338 |
| 2016/0135194 A1* | 5/2016 | Kim | H04L 1/0026 370/329 |
| 2016/0191174 A1* | 6/2016 | Hwang | H04J 11/004 375/348 |
| 2017/0013628 A1* | 1/2017 | Kim | H04W 56/002 |
| 2017/0222671 A1* | 8/2017 | Jin | H04W 72/085 |
| 2017/0265179 A1* | 9/2017 | Jin | H04J 11/005 |
| 2018/0139648 A1 | 5/2018 | Park et al. | |
| 2019/0364454 A1 | 11/2019 | Park et al. | |
| 2019/0364455 A1 | 11/2019 | Park et al. | |

OTHER PUBLICATIONS

3GPP-2, R1-1612050 Views on UL DMRS design, Nov. 2016 (Year: 2016).*

Intel Corporation: "Reference IS/IC Receivers for LTE NAICS Studies", 3GPP DRAFT; R4-131319—NAICS—Reference Receivers, 3rd Generation Partnership Project (3GPP), Mobile Competence Centre; 650, Route Des Lucioles; F-06921 Sophia-Antipolis Cedex; France, vol. RAN WG4, No. Chicago, USA; Apr. 15, 2013-Apr. 19, 2013 Apr. 8, 2013, XP050701574, Retrieved from the Internet: URL:http://www.3gpp.org/ftp/tsg_ran/WG4_Radio/TSGR4_66bis/Docs/ [retrieved on Apr. 8, 2013], 8 pages.

International Search Report and Written Opinion—PCT/US2017/052215—ISA/EPO—dated Mar. 21, 2018.

Partial International Search Report—PCT/US2017/052215—ISA/EPO—dated Dec. 13, 2017.

Mitsubishi Electric: "On Common RS Design between DFT-S-OFDM and OFDM",3GPP Draft; R1-1612375-RAN187-UL RScommonality Mitsubishi, 3rd Generationpartnership-Project (3GPP), Mobile competence Centre, 650, Route Deslucioles; F-06921 Sophia-Antipolis Cedex; France vol. RAN WG1, No. Reno, Nevada; Nov. 14, 2016-Nov. 18, 2016, Nov. 4, 2016 (Nov. 4, 2016), XP051189274, 4 Pages, Retrieved from the Internet: URL:http://www.3gpp.org/ftp/tsg_ran/WG1_RL1/TSGR1_87/Docs/ [retrieved on Nov. 4, 2016].

Qualcomm Incorporated: "Views on UL DMRS Design", 3GPP DRAFT; R1-1612050, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 5, 2016, XP051190282, 4 Pages, Retrieved from the Internet: URL:http://www.3gpp.org/ftp/tsg_ran/WG1_RL1/TSGR1_87/Docs/[retrieved on Nov. 5, 2016].

* cited by examiner

SIGNALING STRATEGY FOR ADVANCED RECEIVER WITH INTERFERENCE CANCELLATION AND SUPPRESSION

CROSS-REFERENCE TO RELATED APPLICATIONS

This application is a divisional of commonly assigned, U.S. patent application Ser. No. 15/707,607, entitled, "SIGNALING STRATEGY FOR ADVANCED RECEIVER WITH INTERFERENCE CANCELLATION AND SUPPRESSION", filed on Sep. 18, 2017, and claims the benefit of U.S. Provisional Patent Application No. 62/421,142, entitled, "SIGNALING STRATEGY FOR ADVANCED RECEIVER WITH INTERFERENCE CANCELLATION AND SUPPRESSION," filed on Nov. 11, 2016, which is expressly incorporated by reference herein in its entirety.

BACKGROUND

Field

Aspects of the present disclosure relate generally to wireless communication systems, and more particularly, to signaling strategies for an advanced receiver with interference cancellation (IC) and suppression.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. A base station may also be referred to as an evolved node B (eNB), a next generation eNB (gNB), an access point, and the like. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes determining, at a transmitter node, enablement of an advanced interference cancellation procedure, and transmitting data by the transmitter node according to a restricted transmission configuration, wherein the restricted transmission configuration is implemented in response to the enablement of the advanced interference cancellation procedure.

In an additional aspect of the disclosure, a method of wireless communication includes obtaining, at a receiver, transmission information associated with one or more interfering waveforms interfering with received communications at the receiver, determining a reference signal for each of the one or more interfering waveforms using the associated transmission information, estimating a channel between each transmitter of the one or more interfering waveforms and the receiver using the determined reference signal, decoding each of the one or more interfering waveforms according to the estimated channel, and subtracting each of the decoded one or more interfering waveforms from the received communications.

In an additional aspect of the disclosure, an apparatus configured for wireless communication includes means for determining, at a transmitter node, enablement of an advanced interference cancellation procedure, and means for transmitting data by the transmitter node according to a restricted transmission configuration, wherein the restricted transmission configuration is implemented in response to the enablement of the advanced interference cancellation procedure.

In an additional aspect of the disclosure, an apparatus configured for wireless communication includes means for obtaining, at a receiver, transmission information associated with one or more interfering waveforms interfering with received communications at the receiver, means for determining a reference signal for each of the one or more interfering waveforms using the associated transmission information, means for estimating a channel between each transmitter of the one or more interfering waveforms and the receiver using the determined reference signal, means for decoding each of the one or more interfering waveforms according to the estimated channel, and means for subtracting each of the decoded one or more interfering waveforms from the received communications.

In an additional aspect of the disclosure, a non-transitory computer-readable medium having program code recorded thereon. The program code further includes code to determine, at a transmitter node, enablement of an advanced interference cancellation procedure, and code to transmit data by the transmitter node according to a restricted transmission configuration, wherein the restricted transmission configuration is implemented in response to the enablement of the advanced interference cancellation procedure.

In an additional aspect of the disclosure, a non-transitory computer-readable medium having program code recorded thereon. The program code further includes code to obtain, at a receiver, transmission information associated with one or more interfering waveforms interfering with received communications at the receiver, code to determine a reference signal for each of the one or more interfering waveforms using the associated transmission information, code to estimate a channel between each transmitter of the one or more interfering waveforms and the receiver using the determined reference signal, code to decode each of the one or more interfering waveforms according to the estimated channel, and code to subtract each of the decoded one or more interfering waveforms from the received communications.

In an additional aspect of the disclosure, an apparatus configured for wireless communication is disclosed. The apparatus includes at least one processor, and a memory coupled to the processor. The processor is configured to determine, at a transmitter node, enablement of an advanced interference cancellation procedure, and code to transmit data by the transmitter node according to a restricted transmission configuration, wherein the restricted transmission configuration is implemented in response to the enablement of the advanced interference cancellation procedure.

In an additional aspect of the disclosure, an apparatus configured for wireless communication is disclosed. The apparatus includes at least one processor, and a memory coupled to the processor. The processor is configured to obtain, at a receiver, transmission information associated with one or more interfering waveforms interfering with received communications at the receiver, code to determine a reference signal for each of the one or more interfering waveforms using the associated transmission information, code to estimate a channel between each transmitter of the one or more interfering waveforms and the receiver using the determined reference signal, code to decode each of the one or more interfering waveforms according to the estimated channel, and code to subtract each of the decoded one or more interfering waveforms from the received communications.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
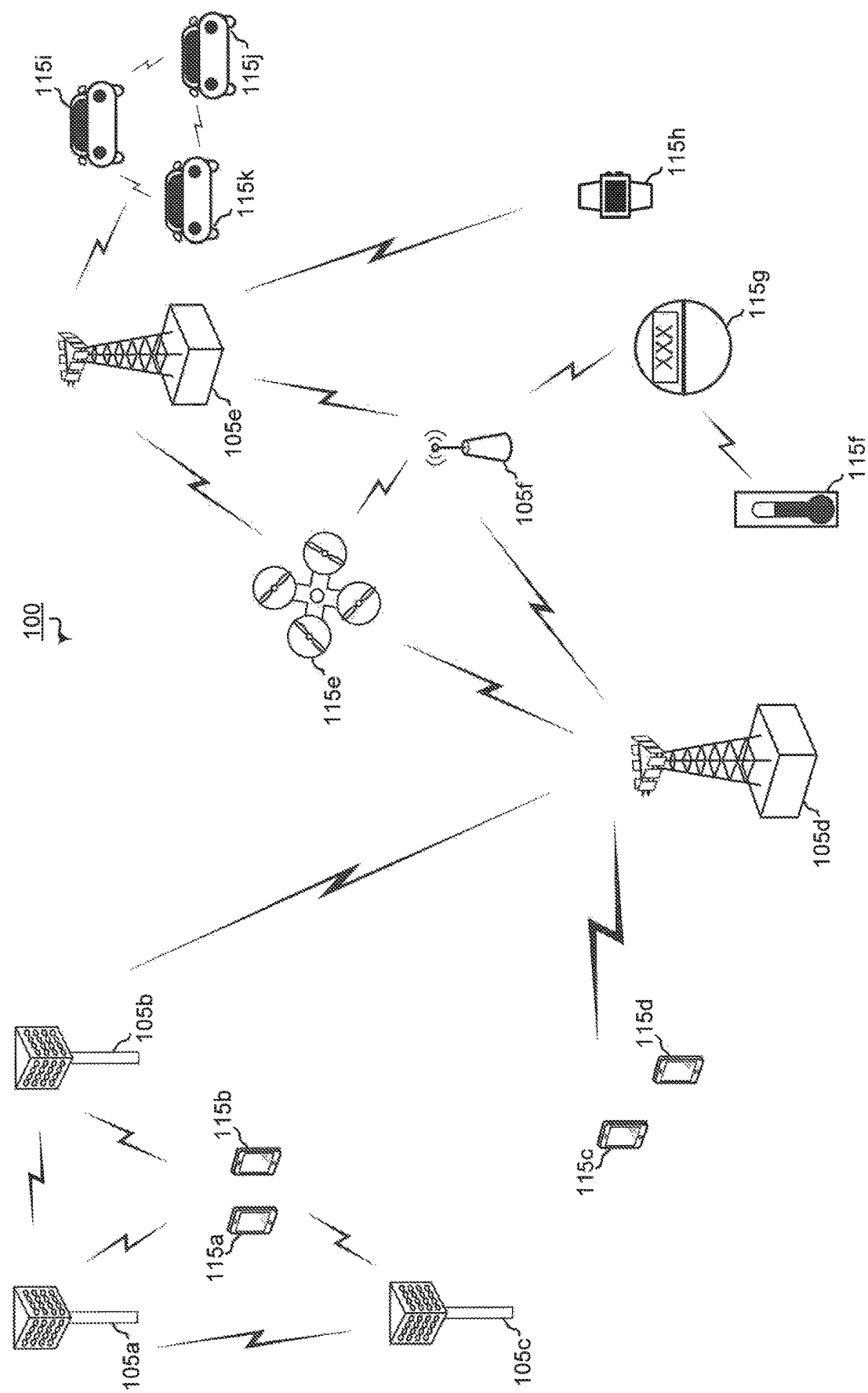
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE, networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the ferrite cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
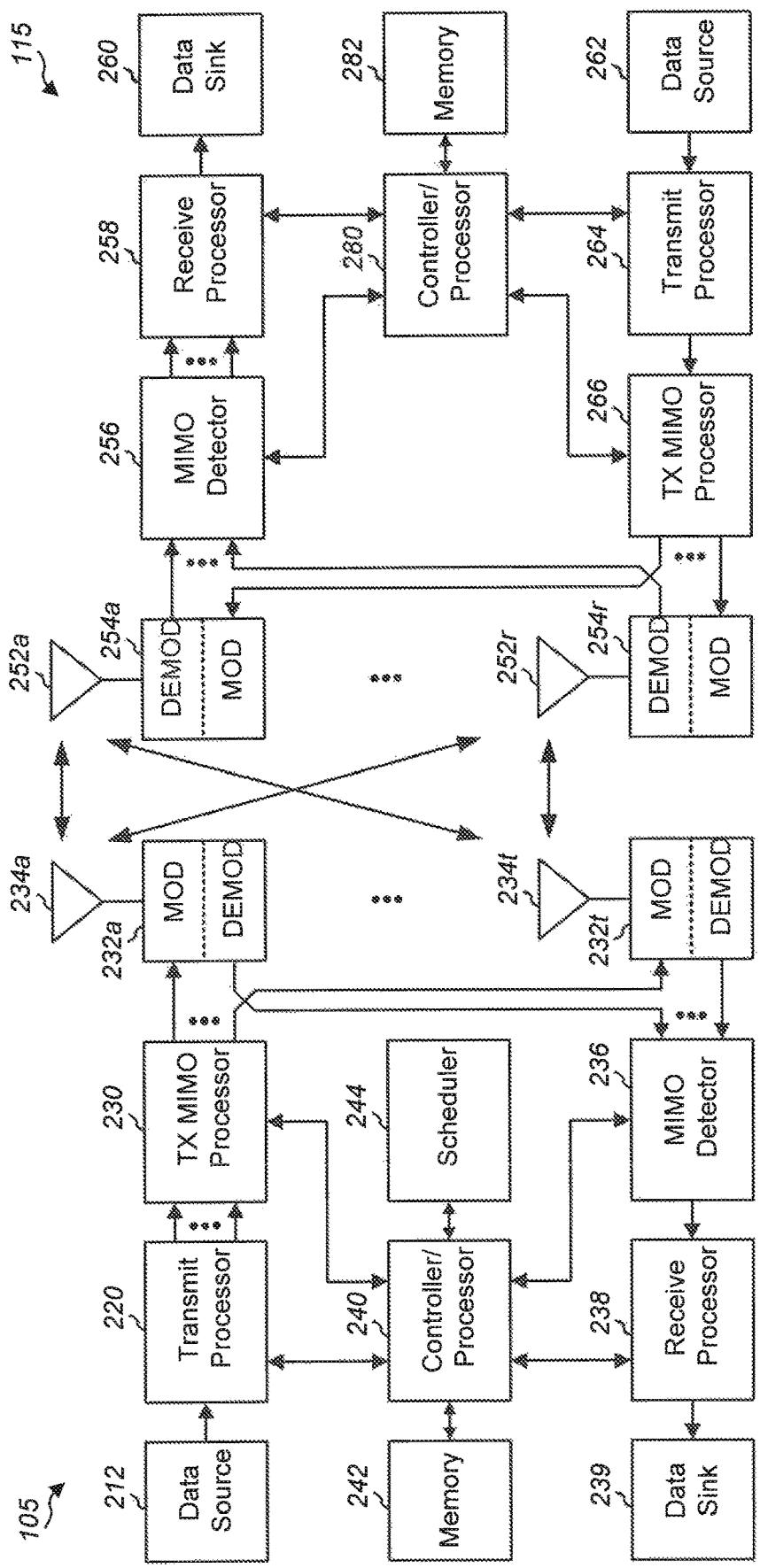
FIG. 2 is a block diagram illustrating a design of a base station and a UE configured according to one aspect of the present disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 6A and 6B, and/or other processes for the techniques described herein. The memories 242 and 282 may store data and program codes for the base station 105 and the UE 115, respectively. A scheduler 244 may schedule UEs for data transmission on the downlink and/or uplink.

In current LTE standards, network assisted interference cancelation and suppression (NAIC), when enabled, is performed on downlink-to-downlink and uplink-to-uplink interference. In 5G networks, in addition to applying NAIC to traditional downlink-to-downlink and uplink-to-uplink interference, interference cancelation and suppression may be applied to any type of interference, including uplink-to-downlink, downlink-to-uplink, and between devices engaged in device-to-device communication. To perform such advanced interference cancellation, the total number of possible interference signals may increase. In order to handle more interference cancelation, it may be beneficial for an advanced receiver to have more information about the interfering signal (e.g., OFDM waveform, RS, ID, etc.).

Figure 3:
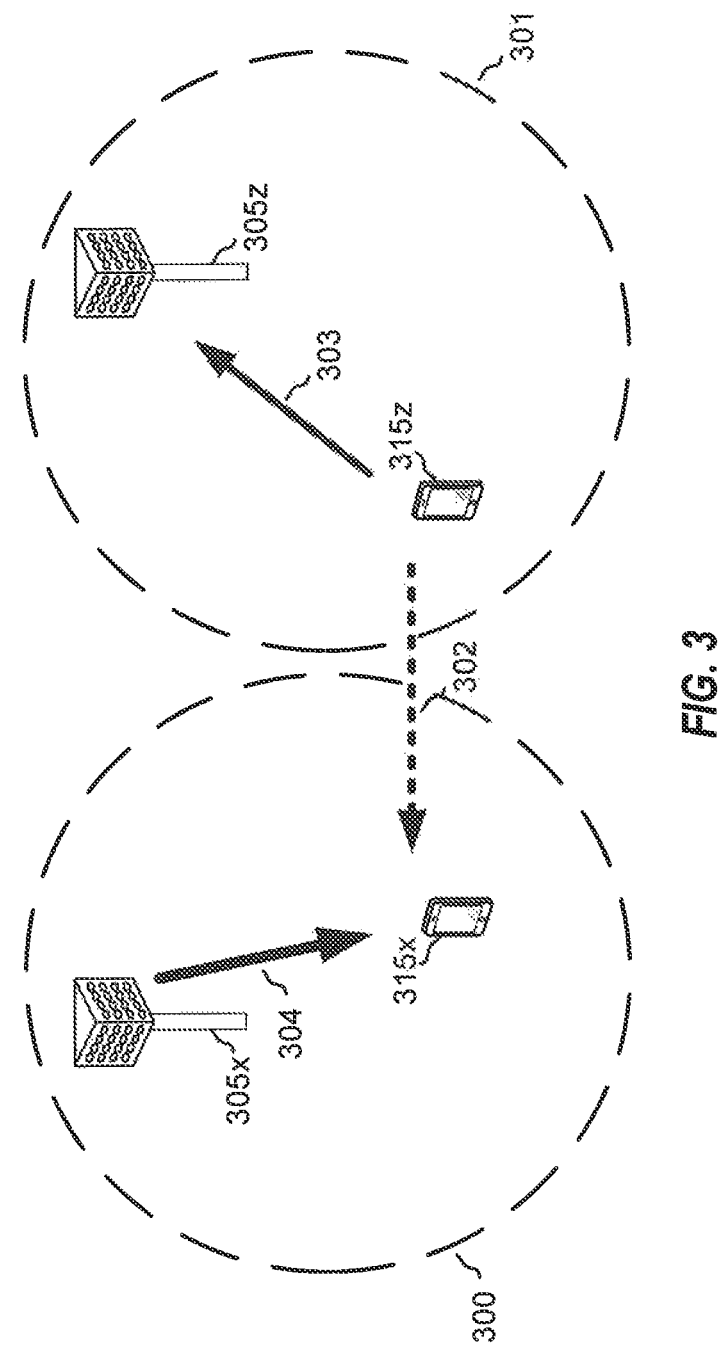
FIG. 3 is a block diagram illustrating base stations and UEs in a wireless network.

FIG. 3 is a block diagram illustrating base stations 305*x* and 305*z* and UEs 315*x* and 315*z*. Base stations 305*x* and 305*z* provide coverage areas 300 and 301 within which UE 315*x* is served by base station 305*x* and UE 315*z* is served by base station 305*z*. In considering interference cancellation at a UE, such as UE 315*x*, interfering signals 302 interfere with downlink transmissions 304 from base station 305*x* at UE 315*x* based on uplink transmissions 303 from UE 315*z* to base station 305*z*. UE 315*x* would like to perform interference cancellation but may not have enough information about interference signal 302 from UE 315*z*, such as whether the signal uses a particular waveform (e.g., OFDM DFT-s-OFDM), allocated RB (e.g., RB starting position/number of RBs), RS sequence (e.g., function of allocated RB), cell identifier (ID) of Interferer, and the like.

Figure 4:
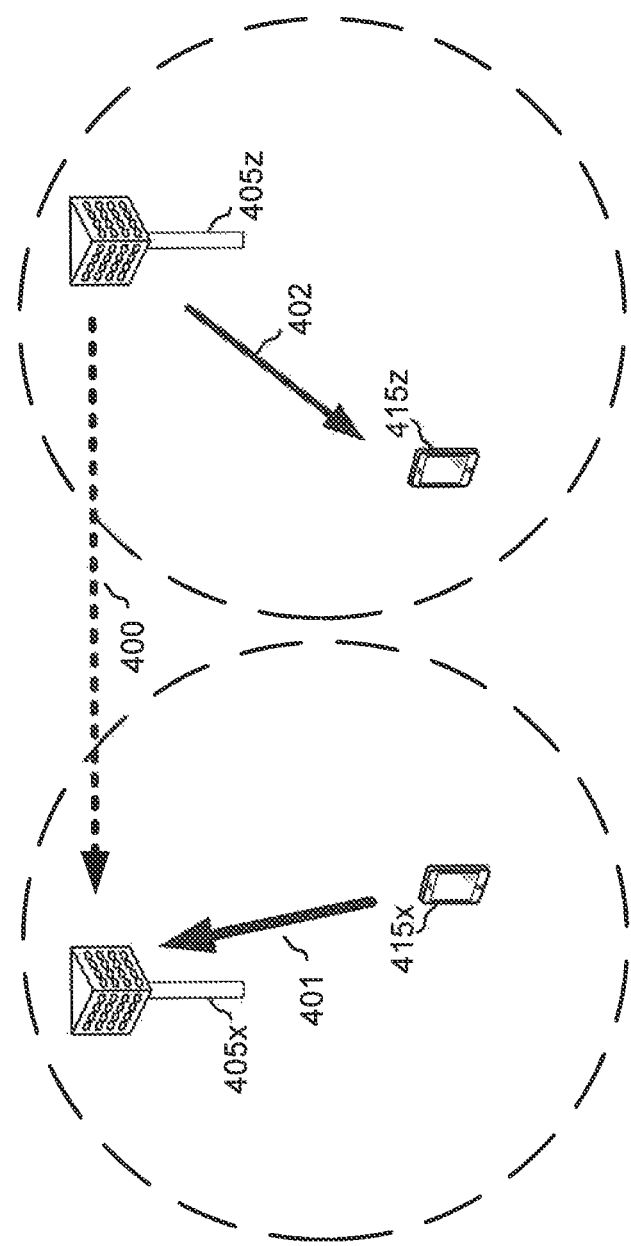
FIG. 4 is a block diagram illustrating base stations and UEs in a wireless network.

FIG. 4 is a block diagram illustrating base stations 405*x* and 405*z* and UEs 415*x* and 415*y*. In considering interference cancellation at a base station, such as base station 405*x*, interfering signals 400 from base station 405*z* may interfere with uplink transmissions 401 from UE 415*x* at base station 405*x*. Interfering signals 400 may arise from downlink transmissions 402 from base station 405*z* to UI 415*z*. Similar to the example of FIG. 3, base station 405*x* may want to perform interference cancellation but may not have enough information about interfering signals 400 from base station 405*z*, such as allocated RB (RBs in use), cell ID of interferer, and the like, to perform the interference cancellation.

Figure 5:
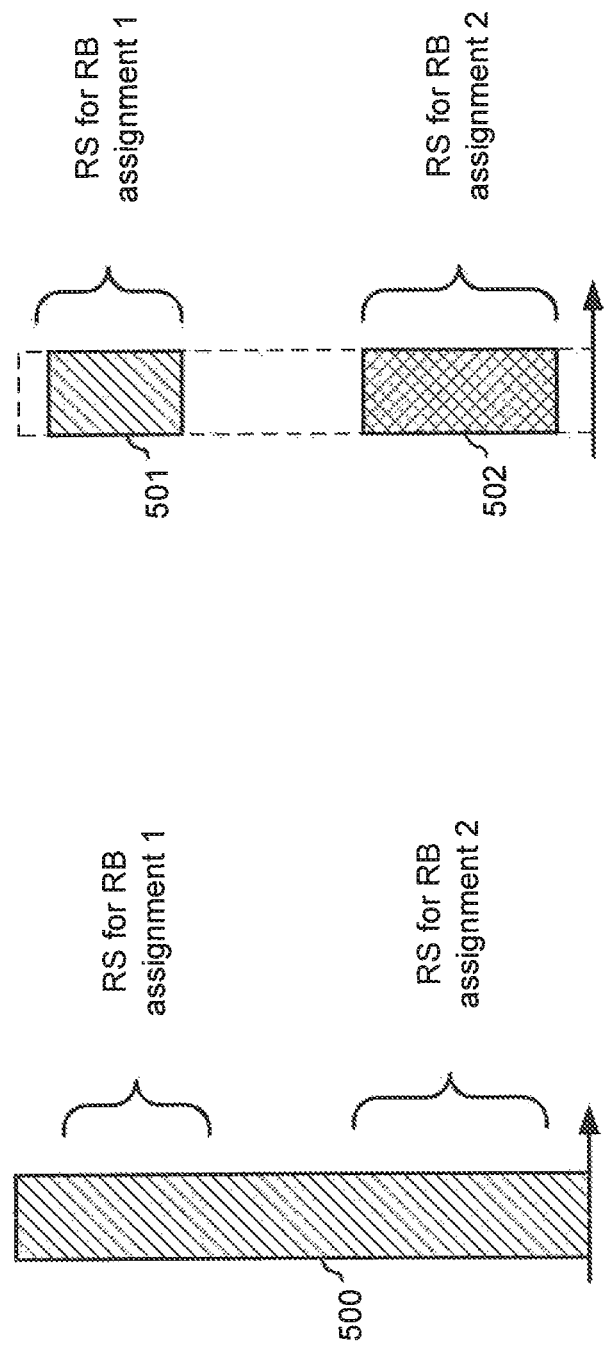
FIGS. 5A and 5B are block diagrams illustrating multiple waveforms that may be used in LTE and 5G communications.

FIGS. 5A and 5B are block diagrams illustrating multiple waveforms used in LTE and 5G communications. There can be a significant difference between RS (reference signals) for OFDM and DFT-s-OFDM waveforms. FIG. 5A illustrates RS 500, which is assigned to RB assignment 1 and RB assignment 2. RS 500 is transmitted over OFDM in a single long sequence for both RB assignment 1 and RB assignment 2, and which is dependent on the cell ID of the transmitting base station. In order for a LTE to detect RS 500, the UE would use the single long sequence for both RB assignment 1 and RB assignment 2. FIG. 5B illustrates RS 501 and 502. RS 501 and 502 are transmitted over DFT-s-OFDM in different short sequences for each of RB assignment 1 and RB assignment 2. In order for a UE to detect RS 501 and 502, the UE would use the starting RB of each respective RB assignment, the assigned number of RBs for each respective assignment, and the cell ID.

Various aspects of the present disclosure are directed to defining transmission restrictions for transmitters in communications where advanced interference cancellation procedures are enabled. Such aspects provide restrictions on the interfering signals, e.g., restriction to a predetermined resource, or subset of resource, restriction on the starting location and/or total size of the resource assignment, and/or restriction on the granularity of the resource assignment. By restricting the transmission of the interfering transmitters, the amount of blind detection at the receiver may be reduced, and may even help the receiver to extract information about an interfering signal.

Figure 6:
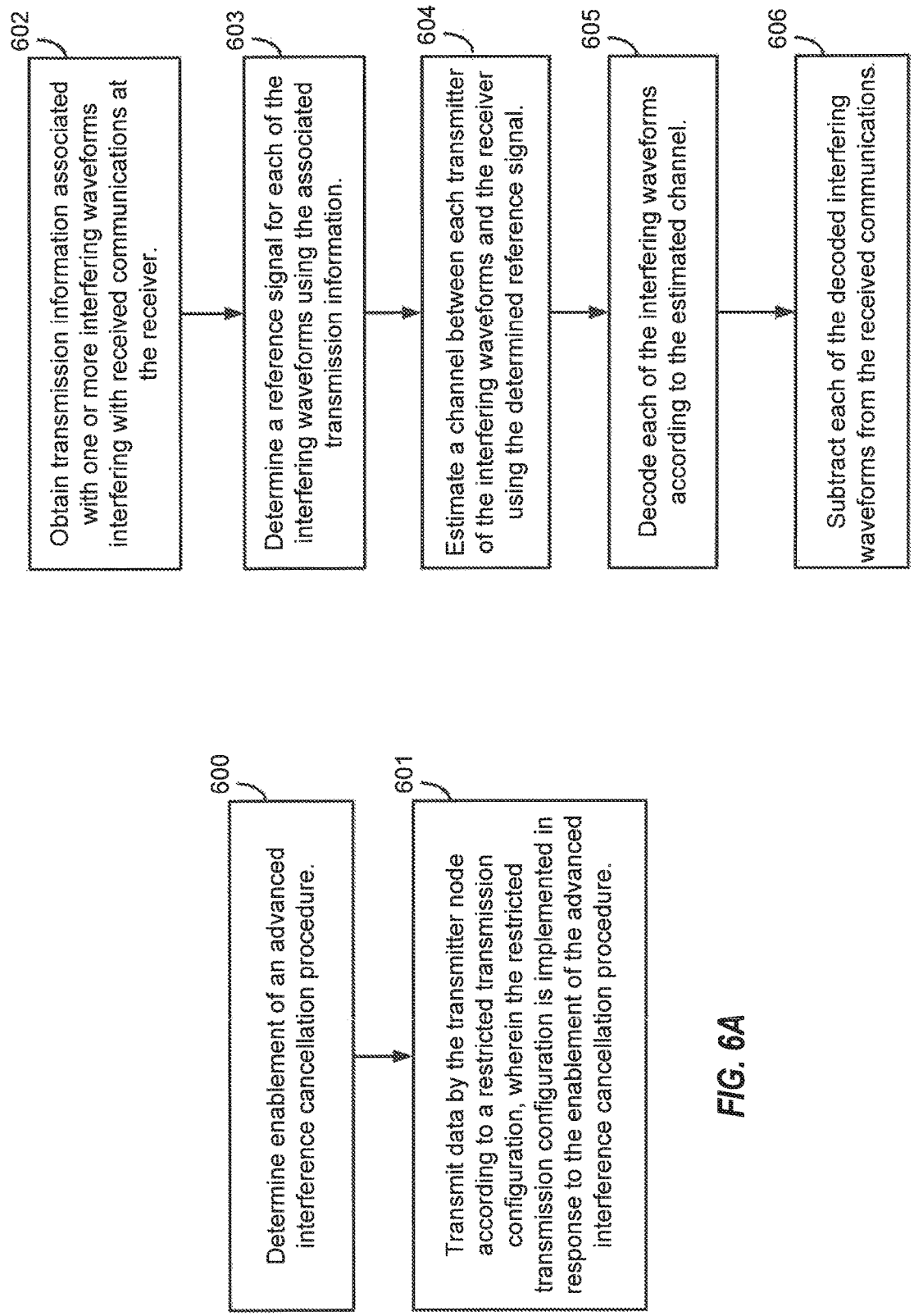
FIGS. 6A and 6B are block diagrams illustrating example blocks executed to implement one aspect of the present disclosure.

FIG. 6A is a block diagram illustrating example blocks executed to implement one aspect of the present disclosure. At block 600 a transmitter determines whether an advanced interference cancellation procedure has been enabled. This determination of enablement may originate from a base station that enables the advanced interference cancellation procedure and signals neighboring base stations or neighboring or served UEs of the enablement. The base station may also merely send scheduling for the interference cancellation operations.

At block 601, the transmitter transmits data according to a restricted transmission configuration, wherein the restricted transmission configuration is implemented in response to the enablement of the advanced interference cancellation procedure. The restricted transmission configuration includes a set of operational parameters that restrict the manner in which the transmitter may transmit the data or reference signals. For example, transmissions using one waveform type (e.g., DFT-s-OFDM) may be restricted to a predetermined set of FDM subbands, or to a particular RB granularity, depending on the total RB allocation, or to a predetermined set of different subframes or symbols. For example, the transmitter may transmit according to a restriction on the starting location of its RB assignment (e.g., starting from the 1$^{st}$ RB, 4$^{th}$, RB, 9$^{th}$ RB, and the like). The transmitter may also transmit with a restriction on the total number of RBs in its RB assignment (e.g., the number of total assigned RBs may be greater than 4 RB and fewer than 40 RB). A transmitter may also transmit using any number of combinations of such restrictions. Transmissions using a different waveform type (e.g., OFDM) may not restrict transmissions at all, or may also restrict transmissions according to the frequency, scheduling, and time restrictions described above.

FIG. 6B is a block diagram illustrating example blocks executed to implement one aspect of the present disclosure. At block 602, an advanced receiver obtains transmission information associated with one or more interfering waveforms interfering with received communications at the advanced receiver. The transmission information may be received directly from another network node, such as via a report transmitted or broadcast over the network. Transmission information may also be determined by the receiver via blind detection, either fully or using some transmission information in order to obtain the remaining information used further in the interference cancellation process.

At block 603, the receiver determines a reference signal for each of the interfering waveforms using the associated transmission information. The receiver may detect and decode the reference signal from each of the interfering waveforms by using the transmission information associated with that particular interfering signal.

At block 604, the receiver estimates a channel between each transmitter of the interfering waveforms and the receiver using the determined reference signal. The reference signal determined at block 603 allows the receiver the estimate the channel between itself and each of the transmitters transmitting the interfering signals.

At block 605, the receiver decodes each of the interfering waveforms according to the estimated channel, and, at block 606, subtracts each of the decoded interfering waveforms from the received communications. The channel estimate and reference signal information regarding each interfering waveform allows the receiver to detect and decode the interfering signal for subtracting of the transmission energy from the received communications.

Figure 7:
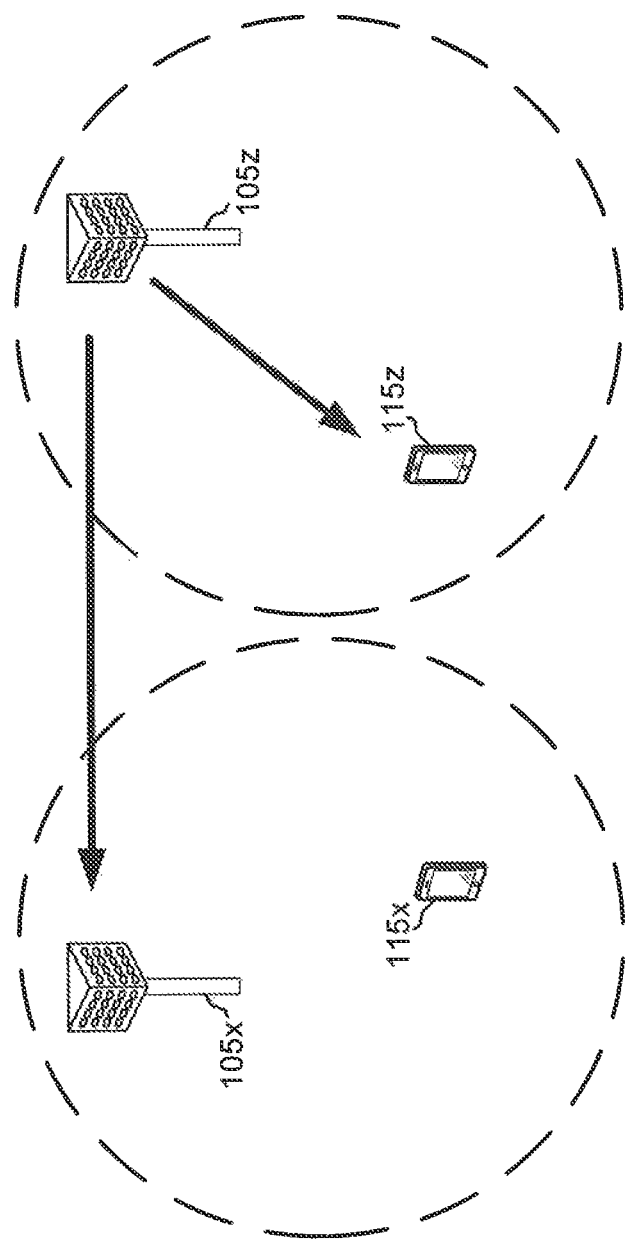
FIG. 7 is a block diagram illustrating base stations and UEs configured according to one aspect of the present disclosure.

FIG. 7 is a block diagram illustrating base stations 105x and 105z and UEs 115x and 115y configured according to one aspect of the present disclosure. In one aspect of the present disclosure, the advanced interference cancellation scheme begins with base station 105z informing its served UE, UE 115z, that the advanced interference cancellation procedure has been enabled. For example, such enablement information may be broadcast as system information. Base station 105z also informs base station 105x that the advanced interference cancellation procedure has been enabled. Base station 105z may also provide its cell ID to base station 105x via the backhaul network. With the advanced interference cancellation enabled by base station 105z, when UE 115z transmits DFT-s-OFDM, it transmits according to a transmission restriction configuration. For example, for DFT-s-OFDM waveform types, UE 115z may transmit on a predetermined subset of FDM frequency bands/sub-bands. Alternatively, UE 115z may transmit on certain a RB granularity, e.g., 4 RB or 8 RB, granularity. UE 115z may also transmit DFT-s-OFDM using specific some subframes or symbols. UE 115z may transmit with a restriction on the starting location on its RB assignment (e.g., RB allocation can start from $1^{st}$ RB, $4^{th}$ RB, $9^{th}$ RB, etc.). LTE 115z may also transmit with a restriction on the total number of RBs on its RB assignment (e.g., number of total assigned RB should be greater than 4 RB and fewer than 40 RB). UE 115z may also transmit with any combinations of above mentioned restrictions. For example, when the total number of RBs is between 1 and 4, RB granularity is 1; when the total number of RB is between 5 and 16, RB granularity is 4; when the total number of RB is between 17 and 64, RB granularity is 16.

When UE 115z transmits using OFDM, the transmission restriction configuration may either allow no restriction or may provide transmissions restricted based on frequency, scheduling, or time as described above. The operations provided for the enablement of advanced interference cancellation and the transmission restrictions placed on the transmitting nodes define a first stage of the advance interference cancellation procedure.

Figure 8:
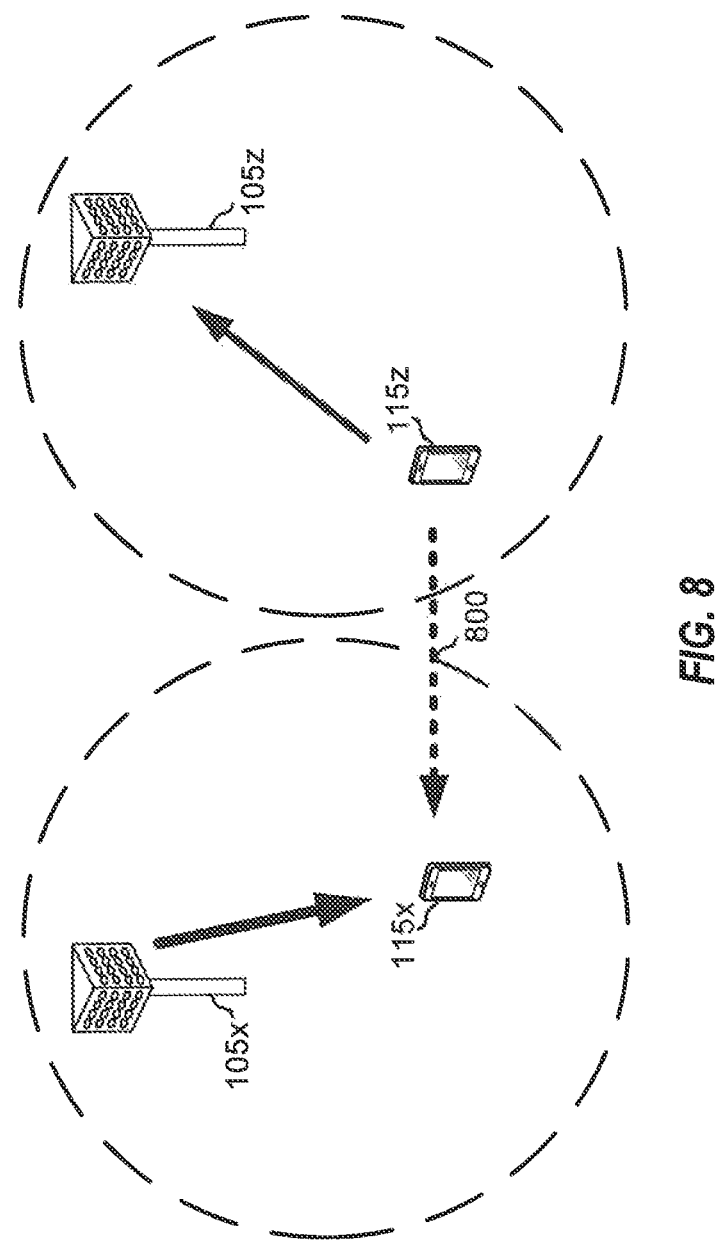
FIG. 8 is a block diagram illustrating base stations and UEs configured according to one aspect of the present disclosure.

FIG. 8 is a block diagram illustrating base stations 105x and 105z and UEs 115x and 115z configured according to one aspect of the present disclosure. In a second stage of the advanced interference cancellation scheme configured for blind detection, base station 105x informs UE 115x that base station 105z enabled advanced interference cancellation. Base station 105x also provides the cell ID of base station 105z to UE 115x. This information may be transmitted in a one-time broadcast as system information or individually transmitted as downlink control information. Upon reception of downlink subframe, UE 115x performs interference cancellation (IC) on interfering signal 800 from UE 115z.

As a part of the IC performed, UE 115x first blind detects UE 115z's RS which involves blind detection of the existence of interfering signal, blind detection of waveform type being used (e.g., OFDM/DFT-s-OFDM), and blind detection of the allocated RB (e.g., start/end RB). In a next step UE 115x estimates the channel from UE 115z to UE 115x based on RS. UE 115x detects and decodes the data from UE 115z based on the estimated channel and subtracts that signal energy from the received transmission.

FIG. 8 may also provide an alternative aspect of the second stage of the advanced interference cancellation scheme. Instead of relying on the receiver (UE 115x) to blind detect most of the additional information used for the IC procedure, the aspect illustrated in FIG. 8 provides for the additional network information to be directly signaled to aid in cancellation that may occur at UE 115x. In such alternative aspects, base station 105z send its scheduling information to base station 105x (via backhaul). The scheduling information may include waveform type, allocated RB, and the like. Base station 105x may inform UE 115x that base station 105z enabled the advanced interference cancellation and additionally provides its cell ID (e.g., via one time broadcast as system information or individually transmitted as downlink control information). Base station 105x may further inform UE 115x about base station 105z's scheduling information (e.g., broadcast as system information or individually transmitted as downlink control information). Upon reception of a downlink subframe, UE 115x performs IC on interfering signal 800. The IC process may include estimating the channel between UE 115z and UE 115x based on the RS. UE 115x may then detect and decode the transmissions from UE 115z based on the estimated channel, and subtract the detected and decoding signal from the received transmission at UE 115x.

Figure 9:
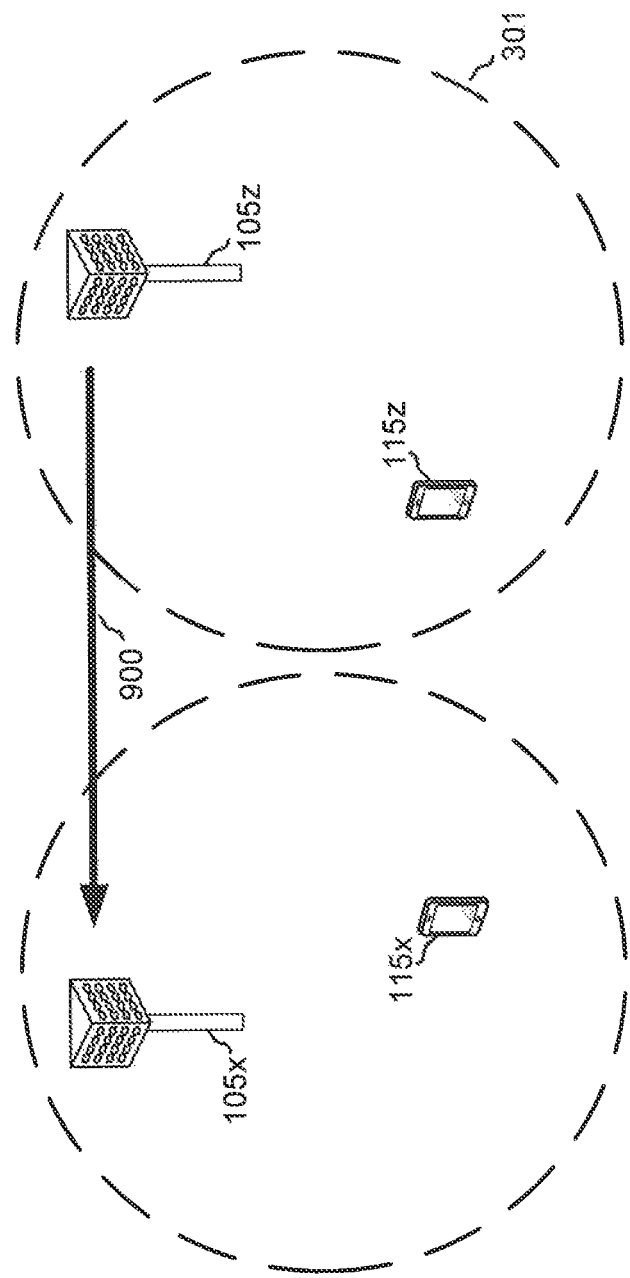
FIG. 9 is a block diagram illustrating base stations and UEs configured according to one aspect of the present disclosure.

FIG. 9 is a block diagram illustrating base stations 105x and 105z and UEs 115x and 115z configured according to one aspect of the present disclosure. The additional aspects of the present disclosure illustrated in FIG. 9 provide advanced interference cancellation schemes for base station interference cancellation. FIG. 9 illustrates the first stage of the advanced interference cancellation procedure. Base station 105z, via backhaul communication 900, informs base station 105x that base station 105z enabled advanced interference cancellation within its coverage area 301 along with providing its cell ID. This step is similar to the first stage process for UE based advanced interference cancellation.

Figure 10:
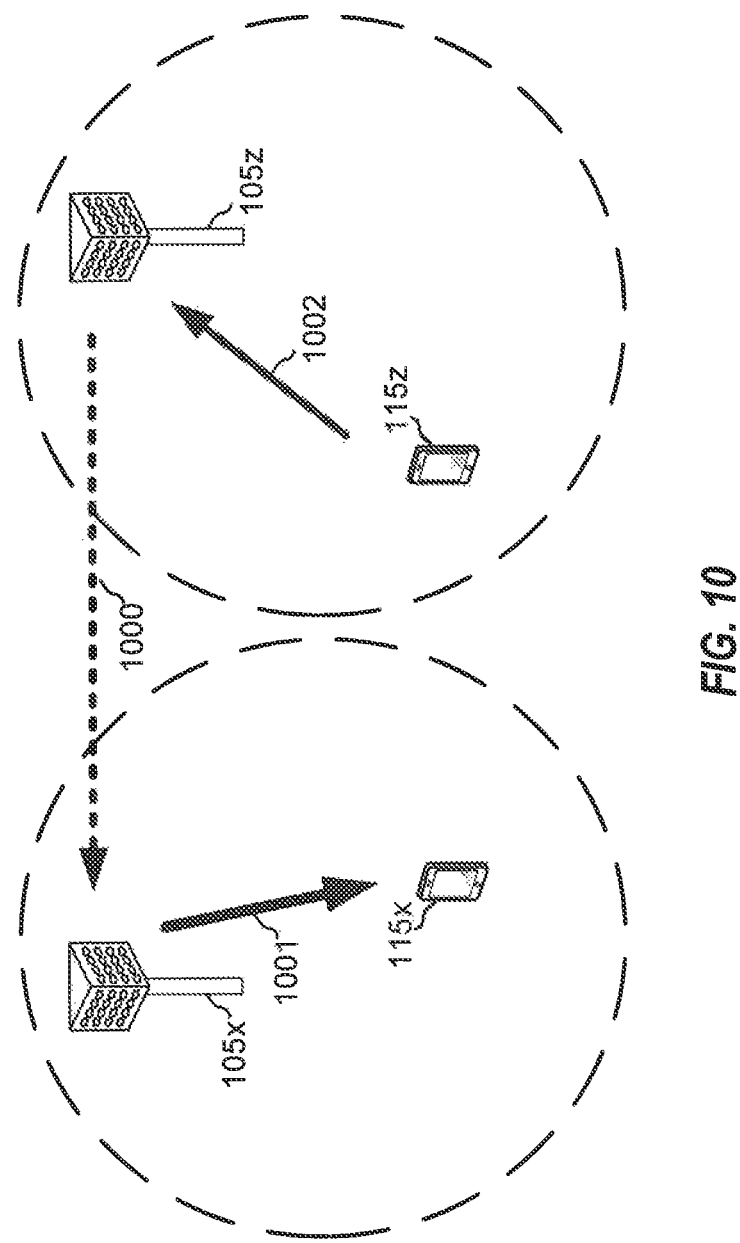
FIG. 10 is a block diagram illustrating base stations and UEs configured according to one aspect of the present disclosure.

FIG. 10 is a block diagram illustrating base stations 105x and 105z and UEs 115x and 115z configured according to one aspect of the present disclosure. In the first aspects of the second stage of the base station-side advanced interference cancellation scheme, blind detection occurs at base station 105x to perform the IC. Upon reception of uplink subframe 1001, base station 105x performs IC on interfering signal 1000 from base station 105z's downlink transmission 1002 to UE 115z. Base station 105x performs blind detection of the RS of base station 105z by blindly detecting for the existence of the interfering signal, and then blindly detecting the allocated RB (e.g., start/end RB). Base station 105x would then estimate the channel from base station 105z to base station 105x based on the blind detected RS. After estimating the channel, base station 105x can detect and decode interfering signal 100 from base station 105z and subtract this signal energy from the received signal at base station 105x.

In an alternative aspect of the second stage of the base station B-side advanced interference cancellation scheme illustrated in FIG. 10, additional network aided cancellation may occur at base station 105x. Base station 105z send its scheduling information to base station 105x via the backhaul communication 900, (FIG. 9) The scheduling information communicated to base station 105x may include various pieces of information, such as waveform type, allocated RB, cell ID, RS sequence, and the like. Upon reception of uplink subframe 1001, base station 105x performs IC on interfering signal 1000 from base station 105z. Instead of blindly detecting the scheduling or transmission information, the example aspect performs channel estimation from base station 105z to base station 105x based on the RS detected in interfering signal 1000 using the received transmitter information. Interfering signal 1000 may then be detected and decoded based on the estimated channel and subtracted from the received signals at base station 105x.

Advanced interference cancellation and suppression according to the various aspects of the present disclosure can be applied to any combination of target receiver signals and interference signals, such as uplink, downlink, and device-to-device communication signals. The interfering signal can be multiple signals from multiple different interfering transmitters. When advanced interference cancellation is enabled, the network may be configured so that the transmitters, which can cause interference to other devices, perform transmissions according to one or more of the following transmission restriction configurations. For example, when UE 115z transmits DFT-s-OFDM, it may transmit its DFT-x-OFCM signals in specifically designated FDM frequency bands/sub-bands, or may transmit in certain RB granularity (e.g., 4 RB, 8 RB, granularity) The RB granularity can depend on the number of allocated RBs for the transmission. For example, when the number of assigned RBs is between 32 and 64, an RB granularity of 8 may be used, when the number of assigned RBs is between 16 and 32, then an RB granularity of 4 may be used, and when the number of assigned RBs is between 1 and 16, an RB granularity of 1 may b used. In a third optional restriction for DFT-s-OFDM, transmissions may be restricted to specifically identified subframes. When UE 115z transmits using the OFDM waveform type, there may either be no restrictions or the same restrictions of RB assignment as for the DFT-s-OFDM restrictions. By restricting the transmission of the interfering transmitters, the amount of blind detection at the receiver may be reduced. Some of the restriction can be specified by the specifications and applied statically, while others may be semi-statically applied via various signaling. The restrictions may further be helpful for an advanced receiver to extract information about interfering signal.

Transmission information for advanced interference cancellation can be transmitted, relayed, or broadcasted by the various network nodes, such as a base station of the connected cell, UEs of the connected cell, base stations of the interfering cell, UEs of the interfering cell, and transmitter and receiver nodes involved in device-to-device communication. The transmission information for advanced interference cancellation may include: an advanced interference cancellation enable flag, waveform type (e.g., DFT-s-OFDM, OFDM), allocated RB, cell ID, UE ID, TTI index, link information (e.g, uplink/downlink/d-to-d, etc.), age of the transmission information, or remaining lifetime of the transmission information.

With the reception of receiver signals corrupted by various interference, the actions that the advanced receiver takes may include detecting the basic transmission information about the interferer's waveform based either on the transmission information for advanced interference cancellation or by blind detection, determining the RS for the interfering signals using this transmission information, estimating the channel for the interfering signals based on their corresponding RS, detecting/decoding the interfering signals, and subtracting the interfering signals from the received signals. The basic transmission information from includes information such as, an advanced interference cancellation enable flag, waveform type, allocated RB, cell ID, UE ID, TTI index, link information, and the like.

Figure 11:
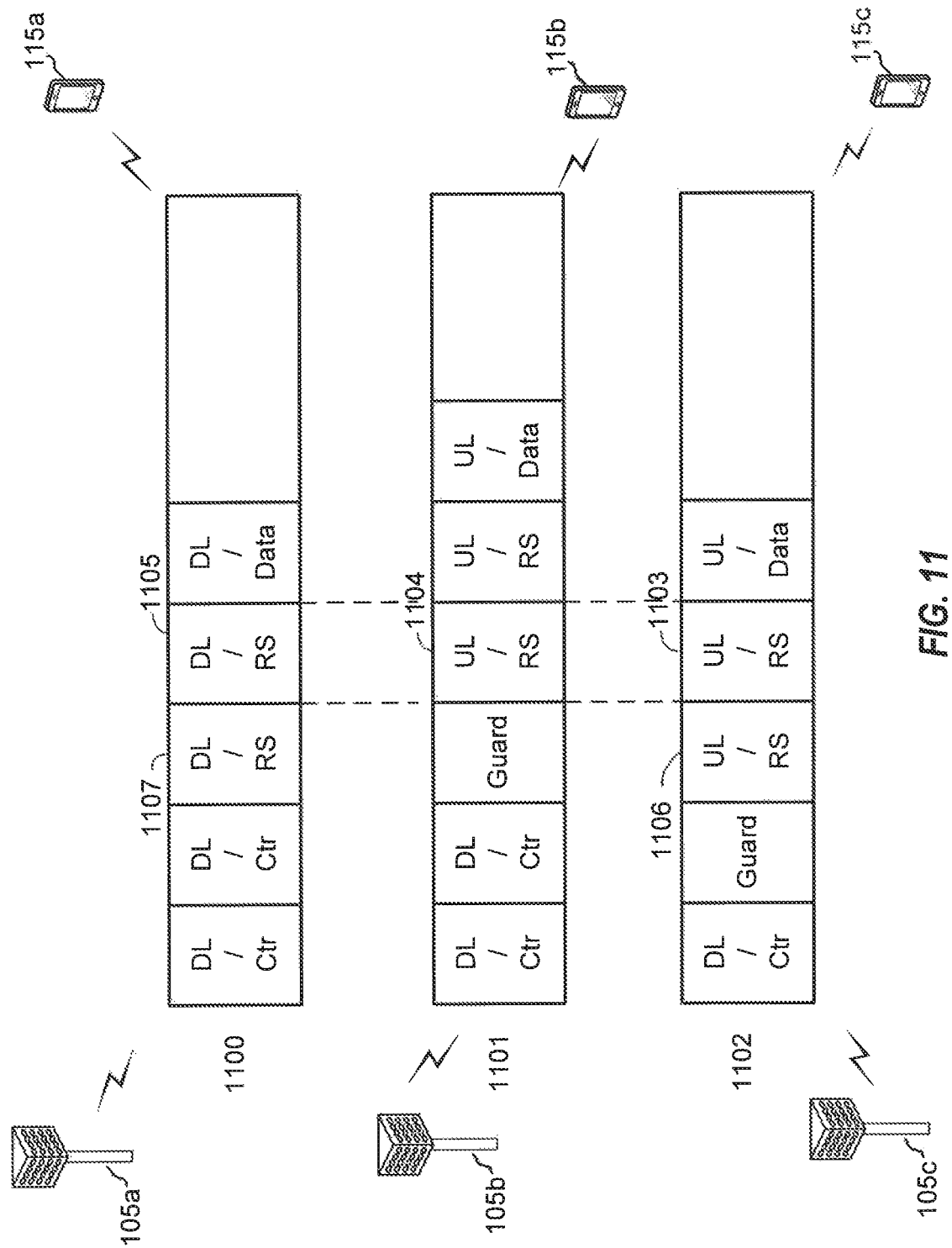
FIG. 11 is a block diagram illustrating base stations and UEs configured according to one aspect of the present disclosure.

FIG. 11 is a block diagram illustrating base stations 105a-105c and UEs 115a-115c configured according to one aspect of the present disclosure. In handling the subframe structure in the various aspects of the advanced interference cancellation schemes of the present disclosure, the subframe structure may be either uplink centric (when more subframes are configured for uplink communication) or downlink centric (when more subframes are configured for downlink communication). For uplink/downlink interference cancellation, the channel is generally measured, which means the RS symbol between downlink/uplink subframe of the different transmission streams should overlap. For example, base station 105a communicates via transmission stream 1100 with UE 115a. Similarly, base stations 105b and 105c communicate with UEs 115b and 115c via transmission streams 1101 and 1102, respectively. In order for either base station 105c or UE 115c to perform IC according to one of the advanced interference cancellation schemes of the present disclosure, one of the subframes in transmission stream 1102 that includes an RS symbol should overlap with RS symbols in the corresponding subframes of transmission streams 1100 and 1101. As illustrated, the RS in subframes 1106 and 1103 of transmission stream 1102 overlap with the RS in subframes 1107 and 1105, respectively, of transmission stream 1100. Additionally, the RS in subframe 1105 of the downlink-centric transmission stream 1100 overlaps with the RS in subframe 1104 of uplink-centric transmission stream 1101, and with the RS in subframe 1103 of uplink-centric transmission stream 1102. In some aspects, interfering signals from transmission streams 1100 and 1101 may be canceled by UE 115e as the RS in subframe 1103 of transmission stream 1102 overlaps with subframe 1104, which includes an RS symbol, of the uplink-centric transmission stream 1101, and subframe 1105 of the downlink-centric transmission stream 1100. Thus, in the various aspects of the present disclosure, the uplink; downlink centric subframes are structured so that at least one RS symbol overlaps.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6A and 6B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal, processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a receiver, an enablement indicator identifying enablement of an interference cancellation procedure at one or more neighboring nodes;
   in response to receiving the enablement indicator, obtaining, at the receiver, transmission information associated with one or more interfering waveforms interfering with received communications at the receiver, wherein the obtaining the transmission information includes:
   receiving a partial set of the transmission information including a cell identifier (ID) of each of the one or more neighboring nodes and a waveform type for transmission at each of the one or more neighboring nodes via signaling from the one or more neighboring nodes, wherein the partial set is insufficient to identify one or more reference signals for the one or more interfering waveforms; and
   subsequent to receiving the partial set, blind detecting, from the one or more interfering waveforms using the partial set, additional transmission information including transmission time interval (TTI) indices associated with the one or more interfering waveforms, wherein the partial set and the additional transmission information are distinct from each other and are sufficient to identify the one or more reference signals;
   determining, at the receiver, a reference signal of the one or more reference signals for each of the one or more interfering waveforms using the associated transmission information;
   estimating, at the receiver, a channel between each transmitter of the one or more interfering waveforms and the receiver using the reference signal determined for each of the one or more interfering waveforms;
   decoding, at the receiver, each of the one or more interfering waveforms according to the channel estimated between each transmitter and the receiver; and
   subtracting, at the receiver, each of the decoded one or more interfering waveforms from the received communications.

2. The method of claim 1, wherein the one or more neighboring nodes includes one or more of:
   a serving base station;
   one or more network neighbor UEs;
   one or more out-of-network neighbor base stations;
   one or more out-of-network neighbor UEs; and one or more transmitter nodes and one or more receiver nodes involved in device-to-device communication.

3. The method of claim 1, wherein the transmission information includes one or more of:
a waveform type for transmission at each transmitter;
user equipment (UE) ID of the each transmitter;
link type identifier; and
age of the transmission information.

4. The method of claim 1, wherein the determining the reference signal includes:
identifying one of the one or more interfering waveforms is transmitted using one of: a first waveform type or a second waveform type;
in response to identifying the first waveform type, detecting for the reference signal in a location associated with one of:
a predetermined set of frequency subbands;
a predetermined resource block granularity, wherein the predetermined resource block granularity corresponds to a number of allocated resource blocks;
a predetermined set of a total number of allocated resource blocks;
a predetermined set of start resource blocks of allocated resource blocks;
a predetermined set of subframes;
a predetermined set of symbols; and
any combination thereof; and
in response to identifying the second waveform type, detecting for the reference signal in the location associated with one of:
any allocated subframe;
the predetermined set of frequency subbands;
the predetermined resource block granularity, wherein the predetermined resource block granularity corresponds to the number of allocated resource blocks;
the predetermined set of the total number of allocated resource blocks;
the predetermined set of start resource blocks of allocated resource blocks;
the predetermined set of subframes;
the predetermined set of symbols; and
any combination thereof.

5. The method of claim 1, further including:
measuring the estimated channel between the receiver and each transmitter, wherein at least one reference signal symbol in a transmission subframe of the each transmitter overlaps with at least one reference signal in a transmission subframe of the receiver.

6. The method of claim 1, wherein the enablement of the interference cancellation procedure selectively restricts data transmission at the one or more neighboring nodes, and wherein the selective restriction of the data transmission is based on a waveform type used for the data transmission at the one or more neighboring nodes.

7. The method of claim 1, wherein the transmission information further includes time interval (TTI) indices associated with one or more interfering waveforms.

8. The method of claim 1, wherein at least one reference signal of the one or more reference signals corresponds to a transmission subframe that overlaps in time with a transmission subframe corresponding to a reference signal communicated to the receiver.

9. The method of claim 1, wherein the enablement of the interference cancellation procedure selectively restricts data transmission at the one or more neighboring nodes to one of discrete Fourier transform spread orthogonal frequency division multiplexing (DFT-s-OFDM) or orthogonal frequency division multiplexing (OFDM).

10. The method of claim 1, wherein determining a first reference signal for a first interfering waveform of the one or more interfering waveforms includes:
determining the first reference signal based on:
a first cell ID associated with the first interfering waveform included in the partial set; and
a first resource block allocation for the first reference signal included in the additional transmission information.

11. An apparatus configured for wireless communication, the apparatus comprising:
at least one processor; and
a memory coupled to the at least one processor,
wherein the at least one processor is configured:
to receive, at a receiver, an enablement indicator identifying enablement of an interference cancellation procedure at one or more neighboring nodes that include one or more out-of-network neighbor user equipments (UEs);
in response to receiving the enablement indicator, to obtain, at the receiver, transmission information associated with one or more interfering waveforms interfering with received communications at the receiver, wherein, to obtain the transmission information, the at least one processor is configured to:
receive a partial set of the transmission information including a cell identifier (ID) of each of the one or more neighboring nodes and a waveform type for transmission at each of the one or more neighboring nodes via signaling from the one or more neighboring nodes, wherein the partial set is insufficient to identify one or more reference signals for the one or more interfering waveforms; and
subsequent to receiving the partial set, blind detect, from the one or more interfering waveforms using the partial set, additional transmission information including time interval (TTI) indices associated with the one or more interfering waveforms, wherein the partial set and the additional transmission information are distinct from each other and are sufficient to identify the one or more reference signals;
to determine, at the receiver, a reference signal of the one or more reference signals for each of the one or more interfering waveforms using the associated transmission information;
to estimate, at the receiver, a channel between each transmitter of the one or more interfering waveforms and the receiver using the reference signal determined for each of the one or more interfering waveforms;
to decode, at the receiver, each of the one or more interfering waveforms according to the channel estimated between each transmitter and the receiver; and
to subtract, at the receiver, each of the decoded one or more interfering waveforms from the received communications.

12. The apparatus of claim 11, wherein the one or more neighboring nodes includes one or more of:
a serving base station;
one or more network neighbor UEs;
one or more out-of-network neighbor base stations; and
one or more transmitter nodes and one or more receiver nodes involved in device-to-device communication.

13. The apparatus of claim 11, wherein the transmission information includes one or more of:
    user equipment (UE) ID of the each transmitter;
    link type identifier;
    age of the transmission information; and
    remaining lifetime of the transmission information.

14. The apparatus of claim 11, wherein the configuration of the at least one processor to determine the reference signal includes configuration of the at least one processor:
    to identify one of the one or more interfering waveforms is transmitted using one of: a first waveform type or a second waveform type;
    to detect, in response to identifying the first waveform type, for the reference signal in a location associated with one of:
        a predetermined set of frequency subbands;
        a predetermined resource block granularity, wherein the predetermined resource block granularity corresponds to a number of allocated resource blocks;
        a predetermined set of a total number of allocated resource blocks;
        a predetermined set of start resource blocks of allocated resource blocks;
        a predetermined set of subframes;
        a predetermined set of symbols; and
        any combination thereof; and
    to detect, in response to identifying the second waveform type, for the reference signal in the location associated with one of:
        any allocated subframe;
        the predetermined set of frequency subbands;
        the predetermined resource block granularity, wherein the predetermined resource block granularity corresponds to the number of allocated resource blocks;
        the predetermined set of the total number of allocated resource blocks;
        the predetermined set of start resource blocks of allocated resource blocks;
        the predetermined set of subframes;
        the predetermined set of symbols; and
        any combination thereof.

15. The apparatus of claim 11, further including configuration of the at least one processor to measure the estimated channel between the receiver and each transmitter, wherein at least one reference signal symbol in a transmission subframe of the each transmitter overlaps with at least one reference signal in a transmission subframe of the receiver.

16. An apparatus for wireless communication, the apparatus comprising:
    means for receiving, at a receiver, an enablement indicator identifying enablement of an interference cancellation procedure at one or more neighboring nodes;
    means for obtaining, at the receiver in response to receiving the enablement indicator, transmission information associated with one or more interfering waveforms interfering with received communications at the receiver, wherein the means for obtaining the transmission information includes:
        means for receiving a partial set of the transmission information including a cell identifier (ID) of each of the one or more neighboring nodes and a waveform type for transmission at each of the one or more neighboring nodes via signaling from the one or more neighboring nodes, wherein the partial set is insufficient to identify one or more reference signals for the one or more interfering waveforms; and
        means for blind detecting, from the one or more interfering waveforms using the partial set, additional transmission information including transmission time interval (TTI) indices associated with the one or more interfering waveforms, wherein the partial set and the additional transmission information are distinct from each other and are sufficient to identify the one or more reference signals;
    means for determining, at the receiver, a reference signal of the one or more reference signals for each of the one or more interfering waveforms using the associated transmission information;
    means for estimating, at the receiver, a channel between each transmitter of the one or more interfering waveforms and the receiver using the reference signal determined for each of the one or more interfering waveforms;
    means for decoding, at the receiver, each of the one or more interfering waveforms according to the channel estimated between each transmitter and the receiver; and
    means for subtracting, at the receiver, each of the decoded one or more interfering waveforms from the received communications.

17. The apparatus of claim 16, wherein the one or more neighboring nodes includes one or more of:
    a serving base station;
    one or more network neighbor UEs;
    one or more out-of-network neighbor base stations;
    one or more out-of-network neighbor UEs; and
    one or more transmitter nodes and one or more receiver nodes involved in device-to-device communication.

18. The apparatus of claim 16, wherein the transmission information includes one or more of:
    a waveform type for transmission at each transmitter;
    user equipment (UE) ID of the each transmitter;
    link type identifier;
    age of the transmission information; and
    remaining lifetime of the transmission information.

19. The apparatus of claim 16, wherein the means for determining the reference signal includes:
    means for identifying one of the one or more interfering waveforms is transmitted using one of: a first waveform type or a second waveform type;
    means for detecting, in response to identifying the first waveform type, for the reference signal in a location associated with one of:
        a predetermined set of frequency subbands;
        a predetermined resource block granularity, wherein the predetermined resource block granularity corresponds to a number of allocated resource blocks;
        a predetermined set of a total number of allocated resource blocks;
        a predetermined set of start resource blocks of allocated resource blocks;
        a predetermined set of subframes;
        a predetermined set of symbols; and
        any combination thereof; and
    means for detecting, in response to identifying the second waveform type, for the reference signal in the location associated with one of:
        any allocated subframe;
        the predetermined set of frequency subbands;
        the predetermined resource block granularity, wherein the predetermined resource block granularity corresponds to the number of allocated resource blocks;

the predetermined set of the total number of allocated resource blocks;

the predetermined set of start resource blocks of allocated resource blocks;

the predetermined set of subframes;

the predetermined set of symbols; and any combination thereof.

20. The apparatus of claim 16, wherein at least one reference signal symbol in a transmission subframe of the each transmitter overlaps with at least one reference signal in a transmission subframe of the receiver.

* * * * *